United States Patent [19]
Hattori

[11] Patent Number: 6,026,201
[45] Date of Patent: Feb. 15, 2000

[54] OPTICAL SCANNER

[75] Inventor: Yutaka Hattori, Kuwana, Japan

[73] Assignee: Brother Kogyo Kabushiki Kaisha, Nagoya, Japan

[21] Appl. No.: 09/174,096

[22] Filed: Oct. 16, 1998

[30] Foreign Application Priority Data

Oct. 31, 1997 [JP] Japan .................................. 9-299964

[51] Int. Cl.⁷ .............................. G06K 7/00; H04N 1/04
[52] U.S. Cl. .......................................... 382/312; 358/494
[58] Field of Search .................................. 358/474, 475, 358/408, 480, 486, 493, 494, 497; 250/208.1, 208.3, 204, 205; 382/312, 318, 321

[56] References Cited

U.S. PATENT DOCUMENTS

| 4,558,357 | 12/1985 | Nakagawa | 358/75 |
| 5,075,770 | 12/1991 | Smyth | 358/80 |
| 5,173,599 | 12/1992 | Setani | 250/208.1 |
| 5,362,957 | 11/1994 | Nakai | 250/208.1 |
| 5,530,562 | 6/1996 | Eisenbarth et al. | 358/496 |
| 5,726,776 | 3/1998 | Auer et al. | 358/494 |
| 5,933,250 | 8/1999 | Ito | 358/481 |

FOREIGN PATENT DOCUMENTS

| 8-265519 | 10/1996 | Japan | H04N 1/113 |
| 147083 | 6/1997 | Japan | H04N 1/113 |
| 9-147083 | 6/1997 | Japan | H04N 1/113 |

Primary Examiner—Jerome Grant, II
Attorney, Agent, or Firm—Oliff & Berridge, PLC

[57] ABSTRACT

An optical scanner that obtains precise and clear image information independent of a position for scanning an object. A plurality of light receiving parts are each composed of a photodiode, for detecting the image information of reflected light, and a detecting lens structured so that the beam diameter of the reflected light at the paired photodiode is larger than a beam diameter $w_0$ expressed by:

$w_0 = 1.22 \times 2l_2 \lambda / W$, where $\lambda$: Wavelength,

W: Exit pupil diameter of imaging means, $l_2$: Image point position, and as the imaging means is an optical element, the principal plane of which is approximately equivalent to the top of the plane, signal variation in a state in which reflected light outside of the photodiodes is reduced.

20 Claims, 8 Drawing Sheets

OPTICAL SCANNER

BACKGROUND OF THE INVENTION

1. Field of the Invention

The invention relates to an optical scanner of a facsimile, a copying machine and other machines provided with an image reading function for reading the image of an object by optically scanning the object to be read.

2. Description of Related Art

Heretofore, in an image reader of, for example, a copying machine for outputting a monochrome or multiple-color printed copy, a light beam from a light source with a single wavelength or a plurality of different wavelengths is radiated on the object, such as an original to be printed, to be read by scanning deflection using a rotating polygon mirror, a galvanomirror, a hologram disc using diffraction effect, a solid deflecting element for deflecting light by varying a refraction index in an optical waveguide acousto-optically or magneto-optically and other comparable devices. The reflected light from the object is received by a light receiving element, such as a photodiode (PD), and image information corresponding to the object read is obtained based upon a signal from the light receiving element.

However, in the above conventional type copying machine, as the reflected light is received by a plurality of light receiving means to obtain image information corresponding to the object, such as disclosed in U.S. Pat. Application No. 08/617,057, for example, the signal waveforms are not uniform when the signals are simultaneously obtained from different light receiving means. Thus, a ripple is caused and the quality of the signals deteriorates. Particularly, when signal variation, in a state in which reflected light transits from one detector to the next detector, is abrupt (i.e. overlap is small), as shown in FIGS. 11 and 12, and a focusing detecting lens is arranged in the light receiving means to improve the quality of a signal, a large ripple is caused in a signal waveform in an area in which signals of the light receiving means are overlapped and correction is difficult.

SUMMARY OF THE INVENTION

Therefore, the invention provides a light beam correcting method and a light beam correcting device wherein a clear image can be obtained without depending upon a scanning position and the characteristics, such as an arranged position of the light receiving means, as disclosed in Japanese published unexamined patent application No. Hei 9-147083.

The invention is made to solve the above problems and the object is to provide an optical scanner wherein image information can be precisely and clearly obtained independent of the position for scanning of an object to be read.

To achieve the object, an optical scanner according to a first aspect of the invention is characterized in that the reflected light, of the radiated light beam, from the object to be read is received by plural light receiving means and image information corresponding to the object to be read is obtained. The plurality of light receiving means are respectively composed of detecting means for detecting the image information of the reflected light and imaging means is structured so that the beam diameter in the detecting means of the reflected light is larger than a beam diameter $w_0$ expressed by the following mathematical expression, wherein the imaging means is an optical element, the principal plane of which is adjacent to or at the rear surface of the optical element relative to the original. The principal plane is defined as a plane parallel to a plane passing through the optical element such that the optical element is divided into two wafer like elements.

$w_0 = 1.22 \times 2 l_2 \lambda / W$ $\lambda$: Wavelength

W: Exit pupil diameter of imaging means $l_2$: Image point position

Therefore, according to the optical scanner structure as described above and the first aspect of the invention, the above detecting means detects the image information of the reflected light from an object to be read. The imaging means enlarges the beam diameter, in the detecting means, of the reflected light so that it is larger than the beam diameter $w_0$ expressed in the mathematical expression 1.

The back focus of the imaging means which is an optical element, having the principal plane as described, is longer than that of an optical element constituted by a spherical surface with a similar focal distance.

Therefore, signal variation in a state in which reflected light is out of a detector is reduced, no ripple is caused in a signal waveform even if an interval between light receiving means is off an ideal state, and precise correction is enabled by a low-priced circuit. Further, reflected light can be efficiently received and precise and clear image information can be obtained independent of a position for scanning of an object to be read.

An optical scanner according to a second aspect of the invention is characterized in that, particularly, the above optical element is a Fresnel lens.

Therefore, according to the second aspect of the invention, the optical element can be realized using plastic material and can be manufactured by injection molding suitable for mass production. Therefore, a high quality of signal can be obtained by a low-priced structure.

An optical scanner according to a third aspect of the invention is characterized in that, particularly, the above optical element is a hologram lens.

Therefore, according to the third aspect of the invention, the optical element can be realized using resist on a plastic substrate and is manufactured by a so-called 2P method using a photopolymer which is one of replication methods suitable for mass production. Therefore, a high quality of signal is obtained by a low-priced structure.

An optical scanner according to a fourth aspect of the invention is characterized in that, particularly, the above detecting means is arranged in a position in which the detecting means and the object to be read are not conjugate based upon the above imaging means.

Therefore, according to the fourth aspect of the invention, the detecting means is arranged in a position in which the detecting means and the object to be read are not conjugate based upon the image means and detects the image information of the reflected light in a beam diameter larger than the limit of diffraction. Therefore, precise and clear image information can be obtained by low-priced structure.

An optical scanner according to a fifth aspect of the invention is characterized in that the above detecting means is arranged in a position nearer to the above imaging means than a position in which the detecting means and the object to be read are conjugate based upon the imaging means.

Therefore, according to the fifth aspect of the invention, the detecting means is arranged in a position nearer to the imaging means than a position in which the detecting means and an object to be read are conjugate based upon the imaging means and the detecting means can detect the image information of reflected light from a wider scanning position. Therefore, the detecting face of the detecting means can be effectively utilized and the scanner can be miniaturized.

An optical scanner according to a sixth aspect of the invention is characterized in that the above imaging means is structured so that the beam diameter in the above detecting means of reflected light is a beam diameter $w_1$ expressed by the following mathematical expression and the detecting means is provided with a larger detecting face than the above beam diameter $w_1$.

$w_1 = (l_1 - f) \times d_e W / f l_1$ f: Focal distance of imaging means $l_1$: Object point position $d_e$: Defocused distance w: Exit pupil diameter of imaging means Therefore, according to the sixth aspect of the invention, the detecting means detects reflected light by having its detecting face larger than beam diameter $w_1$. Therefore, as reflected light from an object to be read can be efficiently detected and a high quality of signal can be obtained by a low-priced structure, precise and clear image information can be obtained.

Further, an optical scanner according to a seventh aspect of the invention is characterized in that the above detecting means is arranged in a position in which the detecting means and an object to be read are conjugate based upon the above imaging means and the imaging means is structured so that the wave front aberration is larger than $1/14$ of the wavelength.

Therefore, according to the seventh aspect of the invention, the detecting means is arranged in a position in which the detecting means and an object to be read are conjugate and a position to detect the image information of the reflected light from the object to be read. As the imaging means generates wave front aberration larger than $1/14$ of the wavelength, the beam diameter in the above detecting means is set so that the beam diameter is larger than the beam diameter $w_0$ expressed by mathematical expression 2. Therefore, signal variation in a state in which reflected light is out of a detector is reduced by using a low-priced component, no ripple is caused in the signal waveform even if an interval between light receiving means is off an ideal state, precise correction is enabled by a low-priced circuit, and precise and clear image information can be obtained independent of a position in which an object to be read is scanned.

As is clear from the above description, according to the first aspect of the invention, as the above plurality of light receiving means are respectively composed of the detecting means for detecting the image information of reflected light and the imaging means structured so that the beam diameter in the detecting means of the reflected light is larger than the beam diameter $w_0$ expressed by the mathematical expression 1, and the imaging means is composed of an optical element having the described principal plane, signal variation in a state in which reflected light is out of a detector is reduced, no ripple is caused in a signal waveform even if an interval between the light receiving means is off an ideal state, precise correction is enabled by a low-priced circuit and precise and clear image information can be obtained independent of a position for scanning an object to be read.

Also, according to the second aspect of the invention, as particularly, the above optical element is a Fresnel lens, a high quality signal is obtained by a low-priced structure.

Also, according to the third aspect of the invention, as particularly, the above optical element is a hologram lens, a high quality of signal is obtained by a low-priced structure.

Also, according to the fourth aspect of the invention, as particularly, the above detecting means is arranged in a position in which the detecting means and an object to be read are not conjugate based upon the above imaging means, a high quality of signal is obtained by a low-priced structure and, further, precise and clear image information can be obtained.

Also, according to the fifth aspect of the invention, as particularly, the above detecting means is arranged in a position nearer to the above imaging means than a position in which the detecting means and an object to be read are conjugate based upon the imaging means, the detecting face of the detecting means can be effectively utilized and the scanner can be miniaturized.

Also, according to the sixth aspect of the invention, as particularly, the above imaging means is structured so that the beam diameter in the above detecting means of reflected light is the beam diameter $w_1$, expressed by the mathematical expression 2 and the detecting means is provided with a detecting face larger than the above beam diameter $w_1$, reflected light from an object to be read can be efficiently detected and, because a high quality of signal can be obtained by a low-priced structure, precise and clear image information can be obtained.

Further, according to the seventh aspect of the invention, as particularly, the above detecting means is arranged in a position in which the detecting means and an object to be read are conjugate based upon the above imaging means and the imaging means is structured so that the wave front aberration is larger than $1/14$ of the wavelength, signal variation in a state in which reflected light is out of a detector is reduced by using a low-priced component, no ripple is caused in a waveform even if an interval between light receiving means is off an ideal state, precise correction is enabled by a low-priced circuit, and precise and clear image information can be obtained independent of a position for scanning an object to be read.

BRIEF DESCRIPTION OF THE DRAWINGS

Preferred embodiments of the invention will be described in detail with reference to the following figures wherein.

DETAILED DESCRIPTION OF THE PREFERRED EMBODIMENTS

Referring to FIGS. 1 to 6, a first embodiment embodying an optical scanner according to the invention will be described below.

First, referring to FIGS. 1 and 2, the configuration of an optical scanner equivalent to the first embodiment, as applied to a copying machine, in which an optical system in an image reading system and an optical system in an image recording system are common, will be described.

Figure 1:
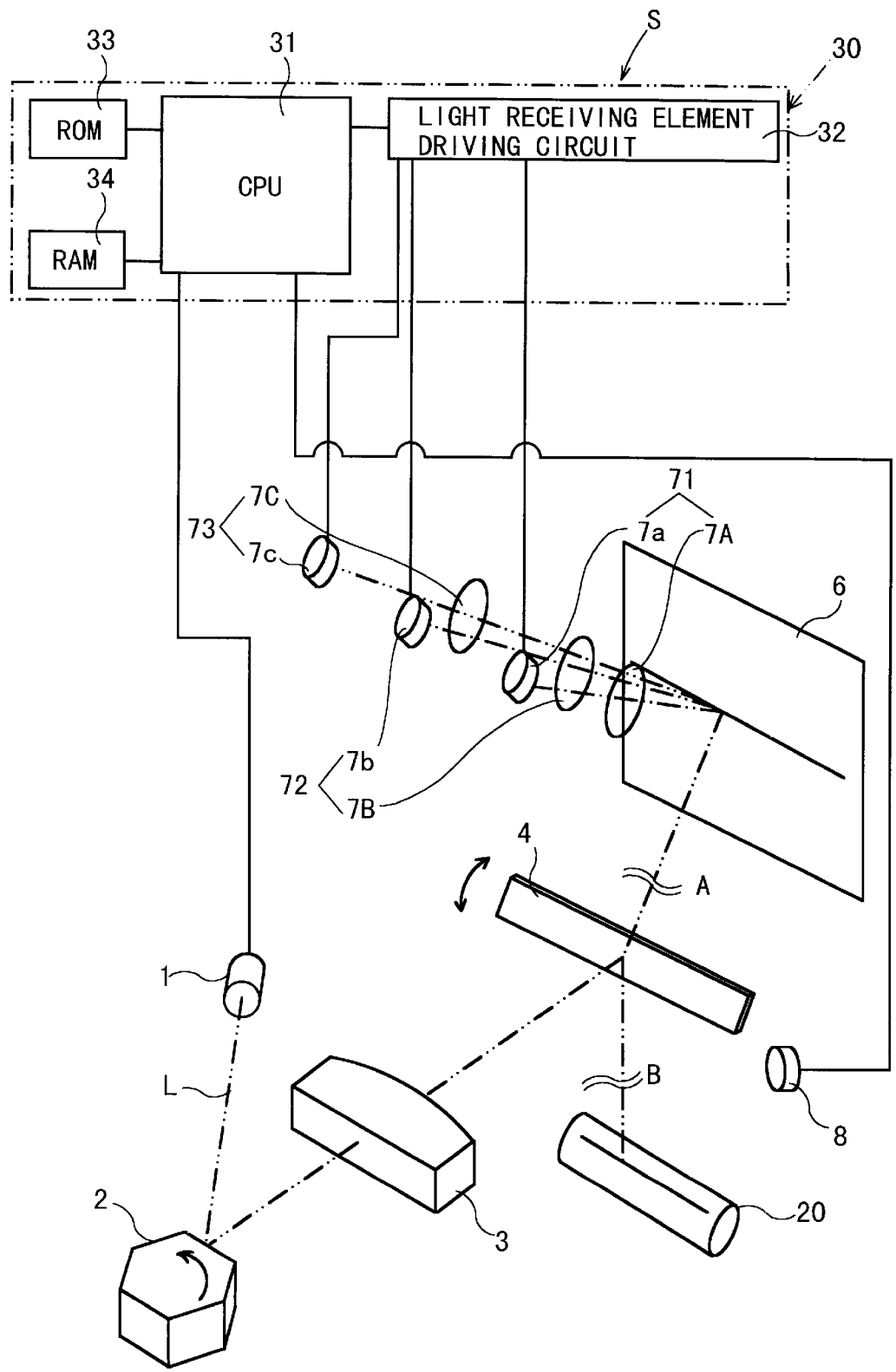
FIG. 1 is a schematic block diagram showing the configuration of an optical scanner equivalent to a first embodiment of the invention.
Figure 2:
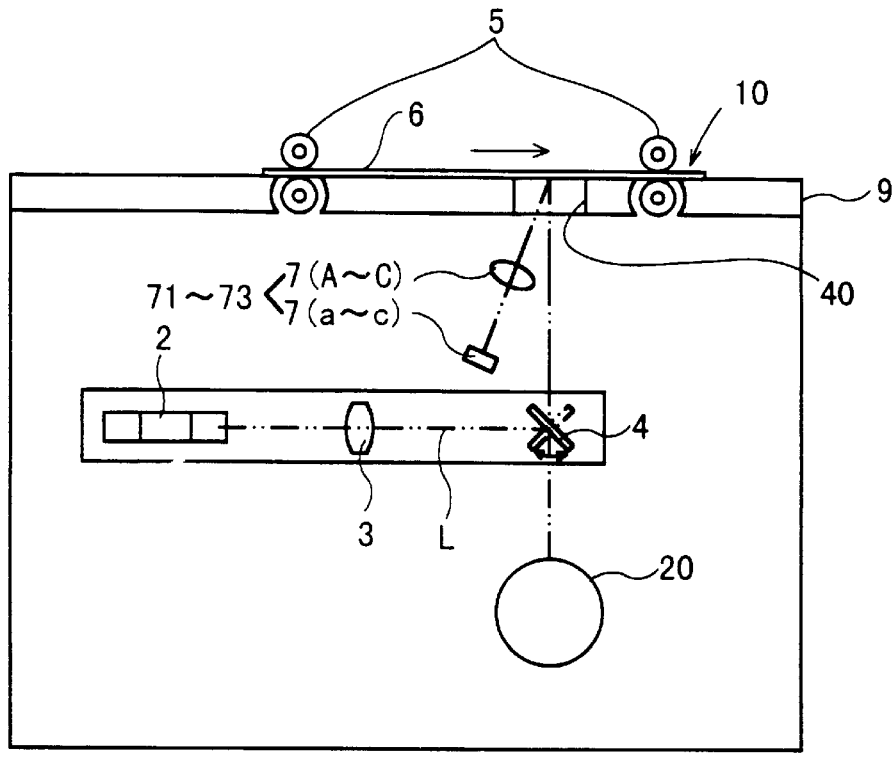
FIG. 2 is a schematic block diagram showing the configuration of a copying machine to which the optical scanner equivalent to the first embodiment is applied.

As shown in FIGS. 1 and 2, an image reading system of the optical scanner S equivalent to the first embodiment is composed of a semiconductor laser 1 as a light source; a polygon mirror 2 for deflecting a light beam L from the semiconductor laser 1; a condensing lens 3 for condensing the light beam L deflected by the polygon mirror 2; a reflecting mirror 4 for selectively radiating the light beam L condensed by the condensing lens 3 on an original 6, as an object to be read, or a photoconductive drum 20, described later; an original carrying part 10 for loading the original 6 and carrying it; three light receiving parts 71,72,73 as light receiving means of the light irradiated onto the original 6 by the reflecting mirror 4, that receive the reflected light from the original 6 to read the original 6; and a control section 30 for controlling the entire scanner.

The above semiconductor laser 1 is controlled so that the light beam L is radiated or the radiation of a light beam is stopped by CPU 31 in the control section 30. The semiconductor laser 1 is installed on a side of the polygon mirror 2 opposite to the view as shown in FIG. 2, i.e. it is behind or hidden by the polygon mirror 2 in the figure. The reflecting mirror 4 is arranged in an optical path linking the polygon mirror 2 and the condensing lens 3 and structured so that the reflecting mirror 4 can be turned in the directions shown by the arrows in FIGS. 1 and 2 by a motor (not shown).

In the meantime, the original carrying part 10 comprises of an original table 9 and two pairs of rollers 5 for carrying the original 6 with the original 6 held between them. An opening 40 for allowing the light beam L, reflected by the reflecting mirror 4 onto the original 6, to pass is provided in the original table 9.

The three light receiving parts 71,72,73 are respectively composed of photodiodes (PD) 7a,7b,7c, which are respectively detecting means, and detecting lenses 7A,7B,7C, which are respectively imaging means. Each pair of a photodiode and a detecting lens forms one light receiving part. Each light receiving part 71,72,73 is installed at an equal interval in a direction parallel to the scanning direction of the original 6, which is perpendicular to the direction of movement of the original carrying part 10. Each photodiode 7a,7b,7c is connected to a light receiving element driving circuit 32 described later.

The control section 30 is composed of the light receiving element driving circuit 32 for synthesizing a signal showing that light is received and detected by each photodiode 7a,7b,7c, RAM 34 for temporarily storing the synthesized signal showing that light is received, ROM 33 for storing a control program for controlling the scanner and CPU 31 for executing the control program and controlling each component.

The image recording system in this embodiment comprises a semiconductor laser 1, a polygon mirror 2, a condensing lens 3, a reflecting mirror 4, and a photoconductive drum 20 for forming an electrostatic latent image by irradiation with a light beam L. The photoconductive drum 20 is controlled by CPU 31 so that the photoconductive drum 20 is rotated by predetermined quantity every time a light beam L scans one line.

The optical path length A from the reflecting mirror 4 to the original 6 is set so that it is equal to optical path length B from the reflecting mirror 4 to the photoconductive drum 20. Thus, the scanned range of the original 6 and the scanned range of the photoconductive drum 20 are approximately equal and the same range as the range of the read original 6 can be readily copied onto the photoconductive drum 20.

Next, referring to FIGS. 1 to 6, the operation of the optical scanner S provided with the above structure will be described.

First, when an image is read from the original 6, the reflecting mirror 4 is turned to the position shown by broken line, in FIG. 2, by a motor (not shown). Next, CPU 31 instructs the semiconductor laser 1 to radiate a light beam L until a position in which reading the original 6 is finished has completely passed the opening 40. The radiated light beam L irradiates the polygon mirror 2 and is deflected by rotating the polygon mirror 2 at fixed speed. Afterward, the deflected light beam L is condensed by the condensing lens 3 and irradiates the reflecting mirror 4. The light beam L which reaches the reflecting mirror 4 is directed to the opening 40 of the original table 9 by the reflecting mirror 4 and reaches the original 6 passing over the opening 40.

In the optical scanner already proposed by the applicants of the invention, and disclosed in Japanese published unexamined patent application No. Hei 9-147083 which is incorporated by reference herein, the intensity of the above light beam L is modulated as an operation for correcting a light beam. Specifically, the above modulation is executed by varying the intensity of the light beam L, in a cyclic manner as the light beam L is scanned which corresponds to a scanned position on the original 6 based upon correction information stored in RAM 34 beforehand to reflect the detection overlap areas. The modulation for each cycle is based on determining, by CPU 31, the elapsed time (scanning time) from when a detector 8 detects the light beam L. The detector 8, such as a photodiode, is arranged outside the scanned range of the original 6, as shown in FIG. 1, and the light beam L is incident on the detector 8 every time a light beam is scanned along a line.

A light beam L which reaches the original 6, loaded on the original table 9, is reflected from the original 6 and the reflected light is returned to the body of the scanner. At this time, for reflected light from a part in which an image, such as a character, is formed on the original 6, a part of the radiated light beam L is absorbed because of the ink, toner and other materials used for forming the image and the intensity of the reflected light is reduced. Conversely, the light beam L is hardly absorbed in the part of the original 6 where an image is not formed, and the reflected light has an intensity larger than that in a part in which an image is formed. The reflected light is condensed by the detecting lenses 7A,7B, 7C, is radiated on the photodiodes 7a,7b,7c, and signals showing that a light beam is received are respectively generated. The respective signals are synthesized by the light receiving element driving circuit 32 and the synthetic signal is stored in RAM 34 via CPU 31 as the image information of the original 6 in a position in which a light beam L is radiated. The image stored in RAM 34 is an image formed by a light beam L, the intensity of which is corrected by the above light beam correcting operation, and an approximately fixed image signal without shading according to the density of an original is obtained even if the image has a synthetic waveform in which plural signals are synthesized.

Figure 3:
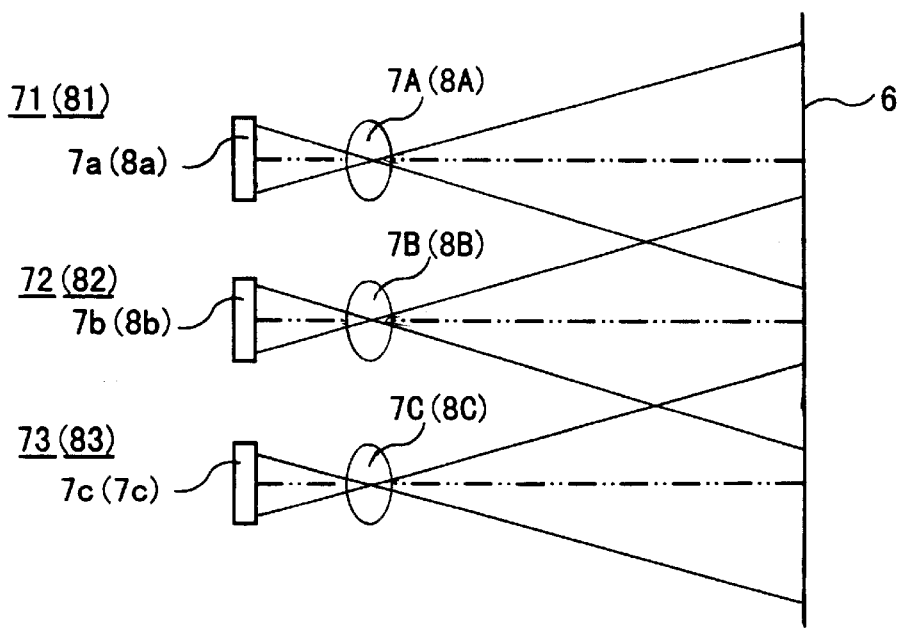
FIG. 3 is an explanatory drawing for explaining the arrangement of a light receiving part in the first embodiment.

In the light receiving parts 71,72,73, as shown in FIG. 3, the detecting lenses 7A,7B,7C are respectively arranged between the original 6 and the associated photodiode 7a,7b, 7c so as to reduce the area in which a light beam is received to secure the high speed response of the photodiode and let reflected light from the original be efficiently incident on the photodiode. Therefore, as the light beam L scans the original 6 from the upper part to the lower part (actually right to left in the scanning direction) in FIG. 3 (viewing upwardly from below the light receiving parts 71–73 in FIG. 1) for example, reflected light scans each detecting face from the lower part to the upper part from the photodiode 7a to photodiode 7c as a minute spot. At that time, a signal is rapidly changed in a boundary in detection between the photodiodes and a ripple is caused in the synthetic waveform. For example, if the detecting lens is a diffraction-limited system and a spot irradiated on the original is small enough, the beam diameter of reflected light on the photodiode is the beam diameter $w_0$ of an airy disc acquired by the following expression.

$w_0 = 1.22 \times 2l_2 \lambda / W$ $\lambda$:Wavelength

W:Exit pupil diameter of detecting lens $l_2$:Image point position

Figure 4:
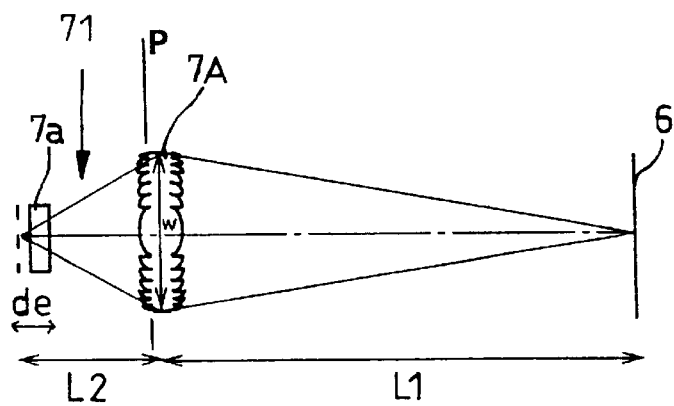
FIG. 4 is an explanatory drawing for explaining the function of the light receiving part in the first embodiment.
Figure 5:
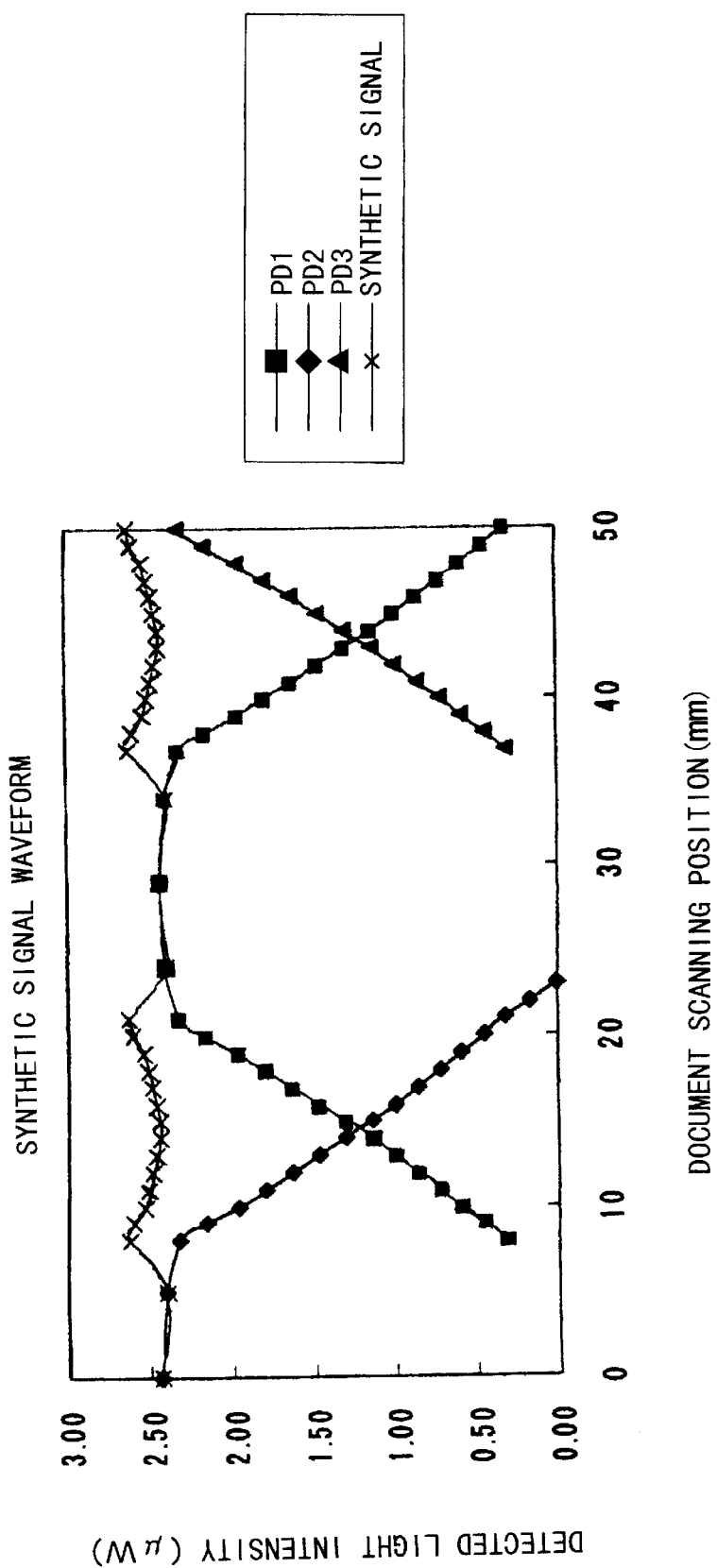
FIG. 5 is a graph showing a first example of a synthetic signal waveform in the first embodiment.

FIG. 4 shows the above state. Reflected light from the original 6 is imaged in a position shown by a broken line as a beam diameter $w_0$ by the detecting lens 7A which is Fresnel lens which belongs to a diffraction-limited system. In this case, even if the above light beam correcting operation is executed, it is difficult to correct the reflected light completely so that the reflected light has a waveform without shading. FIG. 5 shows the waveform of a synthetic signal before the light beam correcting operation in the light receiving part in which the detecting lens is provided with magnification for imaging β of −0.11 is arranged opposite to the photodiode 3 mm square arranged at a pitch of 25 mm. As a light beam L scans the overall white plain original 6 from a scanned position 0 to 50 mm, reflected light is sequentially scanned from the photodiode 7a to photodiode 7c.

Figure 11:
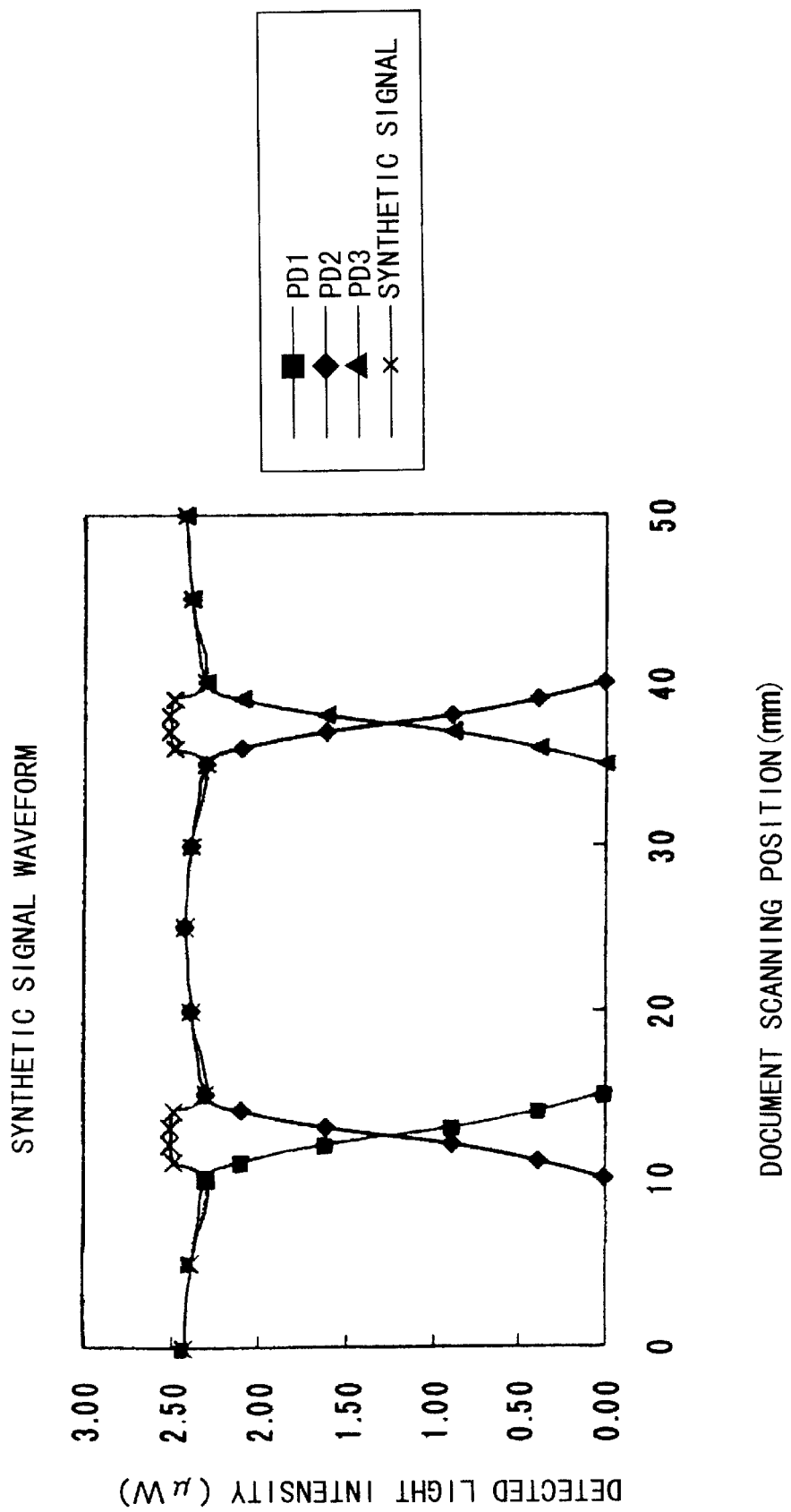
FIG. 11 is a graph showing a first example of a synthetic signal waveform in a conventional type optical scanner.

FIG. 11 shows a signal acquired when each photodiode PD7a,PD7b,PD7c is arranged in the position of a dotted line shown in FIG. 4 and a synthetic signal. The pitch between adjacent photodiodes is set so that an area in which reflected light scans is overlapped with a detection boundary between the photodiodes. The beam diameter on the photodiode of reflected light is 0.44 mm and adjacent photodiodes simultaneously detect a portion of the scanned line approximately 4 mm wide. An appearance that rapid variation (a ripple) of a level is caused in a signal waveform as the state of simultaneous detection changes is observed. The gradient of the ripple is in proportion to the beam diameter of reflected light. That is, a signal in a detection boundary region between the photodiodes gently changes and no ripple is caused in a synthetic waveform by enlarging the beam diameter of reflected light so that it is larger than the limit of diffraction.

Therefore, in this embodiment, as shown in FIG. 4, the photodiode 7a is arranged in a position nearer to the detecting lens 7A than the position shown by the dotted line.

The beam diameter on the photodiode 7a in the above position of reflected light is a beam diameter $w_1$, expressed by the following expression.

$w_1 = (l_1 - f) \times d_e W / f l_1$ f:Focal distance of detecting lens $l_1$:Object point position $d_e$:Defocused distance The above defocused distance '$d_e$' means a distance displaced from a position (an image point) in which the photodiode and an original (an object point) are conjugate. The direction of the above displacement should be on the side near to the detecting lens on the upstream side of the image point as observed from FIG. 3, a signal is detected in the wider scanning width of the original by the photodiode with fixed area and can be effectively utilized.

FIG. 5 shows a synthetic signal waveform before the light beam correcting operation if $l_1 = 50$ mm, $f = 5$ mm, $W = 5$ mm in diameter and $d_e = 1.5$ mm. The beam diameter of reflected light is 1.35 mm and the width corresponding to an original when a beam crosses a boundary between the photodiodes is 17 mm in lateral magnification. If a waveform is synthesized by adjacent photodiodes so that a half value of peak intensity is overlapped, a photodiode 3 mm square is arranged at the pitch of 30 mm. Therefore, FIG. 5 shows that no rapid variation of a level occurs, compared with variation in FIG. 11.

It is not necessarily correct that the larger a beam diameter is, the better it is, as the following beam is not detected by the detector, signal strength is decreased and the quality of a signal is deteriorated if a beam diameter is larger than the width of the detector, the maximum beam diameter should be substantially the same as the detector width. If a beam diameter could be established to be so narrow there was substantially no overlap on adjacent photodiodes, the above light beam correcting operation is not required.

Figure 6:
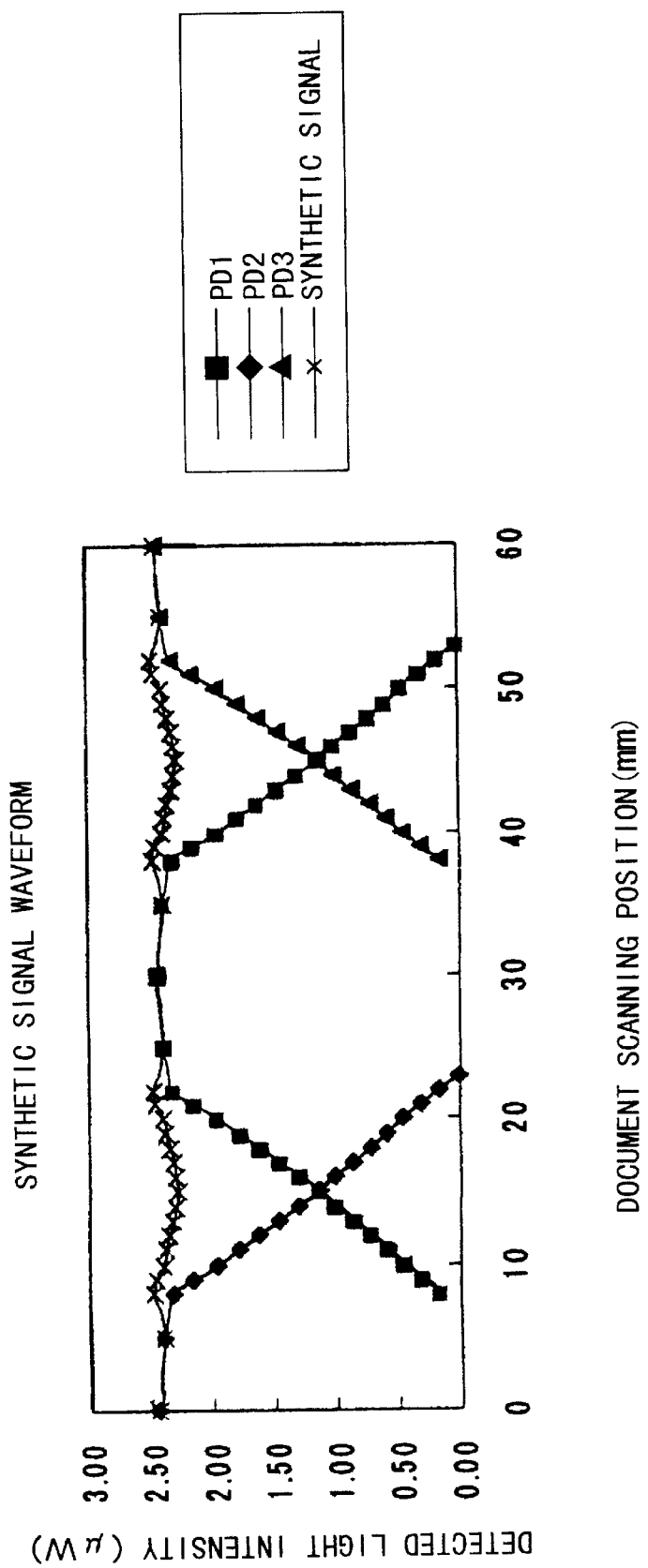
FIG. 6 is a graph showing a second example of a synthetic signal waveform in the first embodiment.
Figure 12:
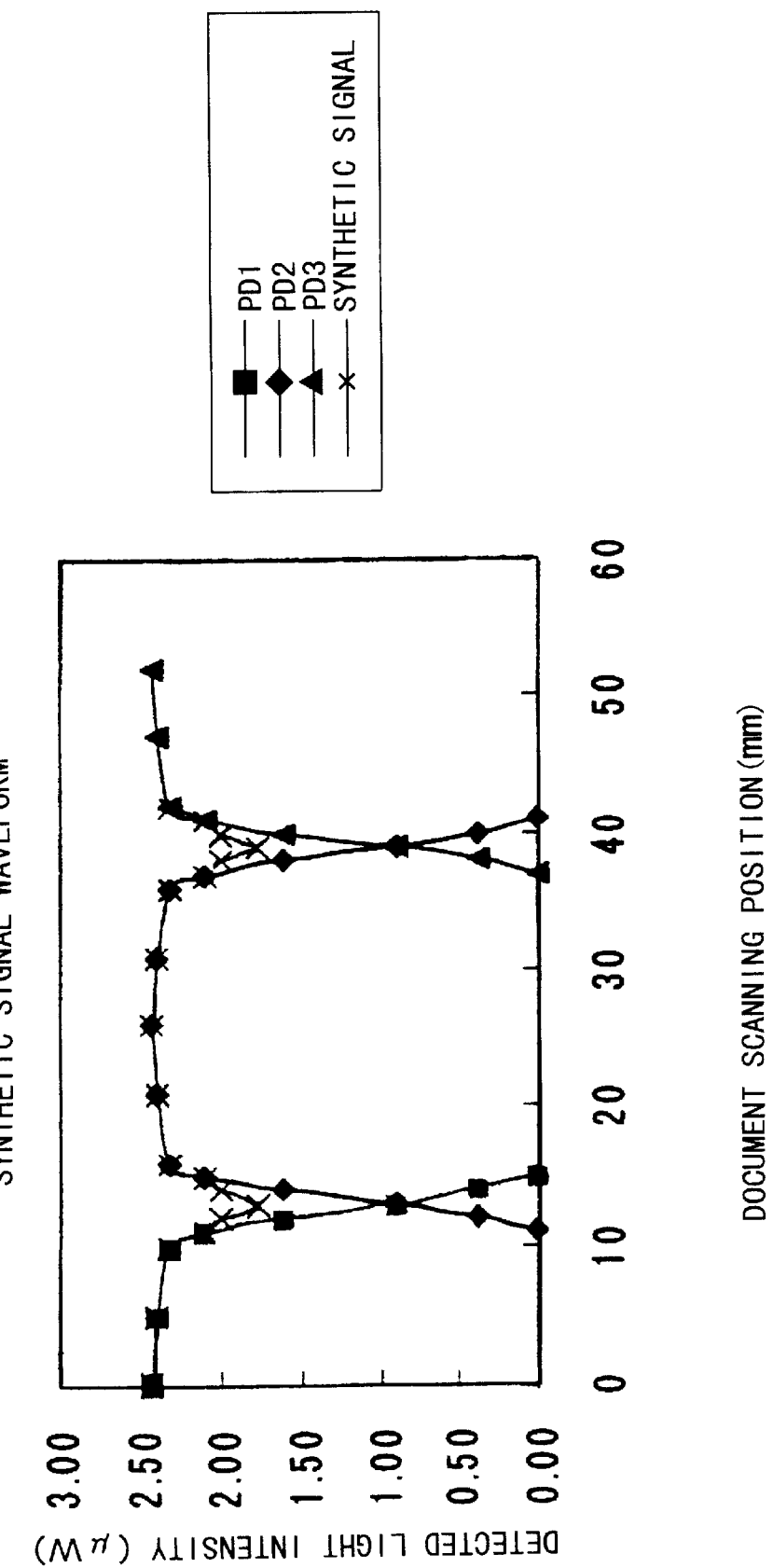
FIG. 12 is a graph showing a second example of a synthetic signal waveform in the conventional type optical scanner.

As described above, there is also an advantage that precision in which the light receiving part is installed is relieved by enlarging the beam diameter of reflected light in addition to an advantage that ripples are reduced. FIG. 12 shows a synthetic signal waveform before a light beam correcting operation in the case where an interval between adjacent light receiving parts in the arrangement shown in FIG. 11 is widened by 1 mm. Similarly, FIG. 6 shows a synthetic signal waveform before the light beam correcting operation in the case where an interval between adjacent light receiving parts in the arrangement shown in FIG. 5 is widened by 1 mm. The variation of strength in the center of overlap caused by the variation of an interval between light receiving parts is relieved up to 8% in FIG. 6, compared with 28% which is a peak in FIG. 12.

Figure 7:
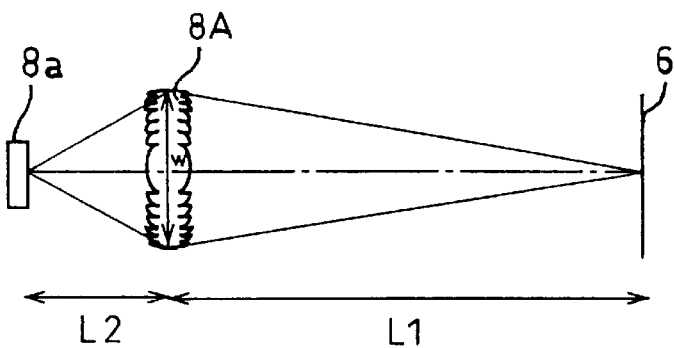
FIG. 7 is an explanatory drawing for explaining the function of a light receiving part in a second embodiment of the invention.

Next, referring to FIG. 7, a second embodiment embodying the optical scanner according to the invention will be described. For the convenience of explanation, FIG. 3 showing the first embodiment will be quoted.

First, the configuration of an optical scanner equivalent to the second embodiment, applied for purposes of description, to a copying machine in which an optical system in an image reading system and an optical system in an image recording system are shared will be described.

The second embodiment is different from the first embodiment in that light receiving parts 81,82,83 are provided in place of the three light receiving parts 71,72,73 as light receiving means for receiving reflected light from the original 6 and reading the original 6. As the other parts are the same as the other parts in the first embodiment, their description is omitted. FIG. 3 shows the configuration of the light receiving parts in the second embodiment which is the light receiving means of the optical scanner according to the present invention. Each of the three light receiving parts 81,82,83 is composed of a photodiode 8a,8b,8c, which is the detecting means, and a detecting lens 8A,8B,8C, which is the imaging means. A pair formed of a photodiode and a detecting lens (8a, 8A; 8b, 8B; 8c, 8C) comprises one light receiving part. Each light receiving part is arranged in a position in which the photodiode and an original are conjugate based upon the detecting lens. FIG. 7 shows the detailed configuration of one light receiving part 81. The photodiode is arranged in a positional relationship that the original 6 and the photodiode 8a are conjugate based upon the detecting lens 8A with the focal distance of f, which meets the following expression.

$1/l_1 + 1/l_2 = 1/f$

Next, the operation of the optical scanner S structured as described above will be described.

The description of the operation is common to the operation in the first embodiment, except the operation of a light receiving part which is different in configuration, is omitted.

Reflected light, according to an image in the original 6, is condensed by the detecting lenses 8A,8B,8C and radiated on the photodiodes 8a,8b,8c. Signals, showing light is received, are generated by the photodiodes and synthesized by the light receiving element driving circuit 32. The synthetic signal is stored in RAM 34 via CPU 31 as image information from the original 6 in a position of the original 6 in which a light beam L is radiated. At that time, as shown in FIG. 3, as a light beam L scans the original from the top to the bottom (actually from left to right in the scanning direction), reflected light sequentially scans the detecting face of the photodiodes as a minute spot from the bottom to the top.

If the detecting lens is a diffraction-limited system using an aspheric surface, the beam diameter of reflected light on the photodiode is a diffraction-limited beam diameter $w_0$ as shown in the mathematical expression 1. Generally, the standard deviation (rms) of the quantity of wave front aberration of a lens, called a diffraction-limited system, is $1/14$ of the wavelength or less and the criterion is called the Rayleigh limit. That is, if the quantity of wave front aberration of the detecting lens is larger than $1/14$ of the wavelength, the beam diameter of reflected light is larger than $w_0$, a signal detected in the detection boundary between the photodiodes gently changes and no ripple is caused in a synthetic waveform.

Specifically, the quantity of wave front aberration of the detecting lens can be increased so that the quantity is more than $1/14$ of the wavelength by using Fresnel lens comprising a spherical surface, for example. That is, a lens which generates spherical aberration, coma and optical effects which are geometrical aberrations needs to be used. In this case, the above lens can be prepared at a lower price than a diffraction-limited lens.

The invention is not limited to the above first and second embodiments and various variations are allowed unless they deviate from the object.

Figure 8:
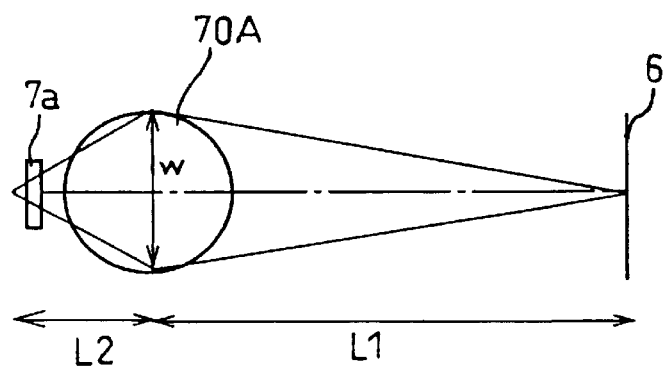
FIG. 8 is an explanatory drawing for explaining the function of a light receiving part using a transformed detecting lens.
Figure 9A:
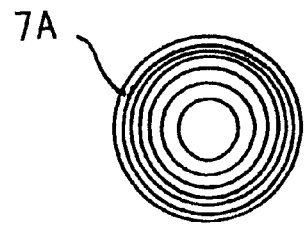
FIGS. 9a-9b are explanatory drawings showing an example using another detecting lens.
Figure 9B:
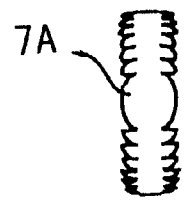

For example, in the first embodiment, a Fresnel lens is used for the detecting lens, however, FIG. 8 shows a case that equal focal distance is provided using a normally used spherical lens. That is, to reduce the focal distance of the detecting lens as much as possible so as to enhance a numerical aperture (NA) on the side of an object and efficiently detect reflected light from the original 6, a lens comprising a normal spherical surface is a ball lens. However, as the principal plane P (FIG. 4) is lowered, i.e. moved more to the center of the lens, a back focus is short and the detector provided with a surface protecting part cannot approach to the detecting lens more than the back focus, the above defocused quantity $d_e$ is limited. Therefore, the principal plane of an optical element used for the detecting lens is approximately equivalent to the top of the plane. The Fresnel lens shown in FIG. 9 is suitable. For production, a plastic injection molding method can be used and the lens can be manufactured at a low price.

Figure 10:
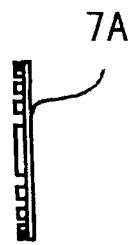
FIG. 10 is an explanatory drawing showing an example using a further detecting lens.

Similarly, as a lens the principal plane of which is equivalent to the top of the plane, a hologram lens, shown in FIG. 10, is also conceivable. As the diffraction effect is utilized, utilization efficiency is deteriorated by the quantity of diffraction efficiency, however, there is an advantage that a pattern can be readily optimized. In manufacture, the 2P method discussed above is excellent for mass production and can be used so that the above lens can be manufactured at a low price.

In the above embodiments, a semiconductor laser is used for a light source, however, a laser provided with directivity for emitting a luminous flux may be used and a solid-state laser such as a yttrium aluminum garnet (YAG) laser may be also used.

To shorten the wavelength of a laser beam, a laser provided with a non-linear optical element may be also used. In this case, an original printed in red can be also readily read. The invention can be widely applied to a device for reading an image optically, such as a copying machine, a facsimile and an image scanner.

What is claimed is:

1. An optical scanner having plural light receiving means to receive light reflected from an object to be read, of a light beam emitted from a light source that is deflected and radiated on the object to be read, to obtain image information corresponding to the information on the read object, wherein the plural light receiving means, comprise:

detecting means for detecting the image information of the reflected light; and imaging means structured so that the beam diameter in the detecting means of the reflected light is larger than a beam diameter $w_0$ expressed by the following expression:

$w_0 = 1.22 \times 2l_2 \lambda)/W$, $\lambda$:Wavelength,

W:Exit pupil diameter of imaging means, $l_2$:Image point position; and the imaging means is an optical element having a principal plane, wherein the principal plane is substantially adjacent a surface of the optical element away from the read object.

2. The optical scanner according to claim 1, wherein the optical element is a Fresnel lens.

3. The optical scanner according to claim 2, wherein the detecting means is arranged in a position in which the detecting means and the read object are not conjugate based upon the imaging means.

4. The optical scanner according to claim 2, wherein the detecting means is arranged in a position in which the detecting means and the read object are conjugate based upon the imaging means; and the imaging means is structured so that a wave front aberration is larger than $1/14$ of the wavelength.

5. The optical scanner according to claim 1, wherein the optical element is a hologram lens.

6. The optical scanner according to claim 5, wherein the detecting means is arranged in a position in which the detecting means and the read object are not conjugate based upon the imaging means.

7. The optical scanner according to claim 5, wherein the detecting means is arranged in a position in which the detecting means and the read object are conjugate based upon the imaging means; and the imaging means is structured so that a wave front aberration is larger than $1/14$ of the wavelength.

8. The optical scanner according to claim 1, wherein the detecting means is arranged in a position in which the detecting means and the read object are not conjugate based upon the imaging means.

9. The optical scanner according to claim 8, wherein the detecting means is arranged in a position nearer to the imaging means than a position in which the detecting means and the read object are conjugate based upon the imaging means.

10. The optical scanner according to claim 9, wherein the imaging means is structured so that the beam diameter in the detecting means is a beam diameter $w_1$, expressed by the following expression:

$w_1 = (l_1 - f) \times d_e W / f l_1$, f:Focal distance of imaging means, $l_1$:Object point position, $d_e$:Defocused quantity; and the detecting means is provided with a detecting face larger than the beam diameter $w_1$.

11. The optical scanner according to claim 1, wherein the detecting means is arranged in a position in which the detecting means and the read object are conjugate based upon the imaging means; and the imaging means is structured so that a wave front aberration is larger than $1/14$ of the wavelength.

12. An image reading apparatus, comprising:

an illumination beam irradiation system;

a carrier that supports an image source;

a plurality of light receiving parts for detecting a portion of a scan line of reflected light from the image source, a segment at an end of the portion detected by a light receiving part also detected by an adjacent light receiving part;

a timing sensor along the scan line but prior to an image area; and a controller that modulates a light beam emitted by the illumination beam irradiation system to reduce light beam intensity at overlap segments of the scan to avoid increased image strength in the overlap segments.

13. The image reading apparatus according to claim 12, wherein each light receiving part comprises a detecting lens and a detector.

14. The image reading apparatus according to claim 13, wherein the detector is arranged such that the detector and the image source are not conjugate based on the detecting lens.

15. The image reading apparatus according to claim 13, wherein the detector has a detecting face larger than a diameter of the reflected light beam.

16. The image reading apparatus according to claim 13, wherein the detector and the image source are conjugate based on the detecting lens and the detecting lens produces a wave front aberration larger than $1/14$ of a wavelength of the light beam emitted by the illumination beam irradiation system.

17. The image reading apparatus according to claim 13, wherein the detecting lens creates a reflected light diameter greater that $w_0$ where $w_0 = 1.22 \times 2 l_2 \lambda / W$ and $\lambda$=light beam wavelength W=exit pupil diameter of detecting lens $l_2$ =image print position.

18. The image reading apparatus according to claim 17, wherein the detecting lens has a principal plane substantially adjacent a side of the detecting lens away from the image source.

19. The image reading apparatus according to claim 18, wherein the detecting lens is a Fresnel lens.

20. The image reading apparatus according to claim 18, wherein the detecting lens is a hologram lens.

* * * * *